(12) United States Patent
Schulz et al.

(10) Patent No.: US 11,505,688 B2
(45) Date of Patent: *Nov. 22, 2022

(54) SCRATCH-RESISTANT STYRENE COPOLYMER COMPOSITION CONTAINING MODIFIED ORGANOPOLYSILOXANE COMPOUNDS

(71) Applicant: INEOS STYROLUTION GROUP GMBH, Frankfurt am Main (DE)

(72) Inventors: Tobias Schulz, Cologne (DE); Norbert Niessner, Friedelsheim (DE); Eike Jahnke, Aubonne (CH); Hans-Werner Schmidt, Bayreuth (DE); Tristan Kolb, Bayreuth (DE)

(73) Assignee: INEOS STYROLUTION GROUP GMBH

( * ) Notice: Subject to any disclaimer, the term of this patent is extended or adjusted under 35 U.S.C. 154(b) by 175 days.

This patent is subject to a terminal disclaimer.

(21) Appl. No.: 16/633,284

(22) PCT Filed: Jul. 25, 2018

(86) PCT No.: PCT/EP2018/070154
§ 371 (c)(1),
(2) Date: Jan. 23, 2020

(87) PCT Pub. No.: WO2019/020686
PCT Pub. Date: Jan. 31, 2019

(65) Prior Publication Data
US 2020/0140670 A1 May 7, 2020

(30) Foreign Application Priority Data
Jul. 26, 2017 (EP) ..................................... 17183289

(51) Int. Cl.
*C08L 25/12* (2006.01)
*C08L 25/14* (2006.01)
*C08J 3/20* (2006.01)

(52) U.S. Cl.
CPC ............... *C08L 25/12* (2013.01); *C08J 3/203* (2013.01); *C08L 25/14* (2013.01); *C08J 2325/12* (2013.01); *C08J 2325/14* (2013.01); *C08J 2483/06* (2013.01)

(58) Field of Classification Search
CPC . C08L 25/12; C08L 25/14; C08J 3/203; C08J 2325/12; C08J 2325/14; C08J 2483/06; C08J 2315/14
USPC .......................................................... 524/89
See application file for complete search history.

(56) References Cited

U.S. PATENT DOCUMENTS

2008/0242779 A1  10/2008  Gaggar et al.
2017/0327688 A1  11/2017  Kim et al.

FOREIGN PATENT DOCUMENTS

| GB | 1353501 A | 5/1974 |
|---|---|---|
| JP | S57187346 A | 11/1982 |
| JP | S61118433 A | 6/1986 |
| JP | S6239610 A | 2/1987 |
| JP | H0625507 A | 2/1994 |
| JP | 2009098557 A * | 5/2009 |
| KR | 20140147285 A | 12/2014 |
| KR | 20160061628 A | 6/2016 |
| WO | 2016080675 A1 | 5/2016 |

OTHER PUBLICATIONS

JP 2009-098557 A, machine translation, EPO espacenet. (Year: 2009).*
International Preliminary Report on Patentability in International Application No. PCT/EP2018/070154, dated Jul. 9, 2019.

* cited by examiner

*Primary Examiner* — Josephine L Chang
(74) *Attorney, Agent, or Firm* — Raphael Bellum PLLC

(57) ABSTRACT

A scratch-resistant thermoplastic polymer composition (P) comprising 88 to 99.9 wt.-% of at least one styrene-based copolymer, 0.1 to 5 wt.-% of at least one modified organopolysiloxane compound, and optionally at least one colorant, dye or pigment, and/or at least one further additive, provides with improved properties.

16 Claims, No Drawings

SCRATCH-RESISTANT STYRENE COPOLYMER COMPOSITION CONTAINING MODIFIED ORGANOPOLYSILOXANE COMPOUNDS

The invention relates to thermoplastic polymer compositions (P) comprising at least one styrene-based polymer (A) and at least one modified organopolysiloxane compound (B). The thermoplastic polymer composition (P) is characterized by having improved scratch-resistance, improved residual gloss after abrasion combined with improved melt flow characteristics while heat resistance is substantially not affected.

Styrene copolymers are widely used in many applications, e.g. in automotive industry or for household goods. The popularity of these thermoplastic polymer compositions may be attributed to their balanced properties of good melt flow characteristics which is an important feature for injection molding processes, combined with a competitive price and good UV resistance.

However, as with many polymers, the resistance of conventional styrene copolymers against scratch and abrasion is very low. In view of this, alternative solutions have been established in the art for the provision of scratch-resistant surfaces of polymer articles. One solution was found in the application of poly(methyl methacrylate) (PMMA) as base polymer of the respective articles. PMMA is characterized by having good scratch resisting properties. However, compared to polystyrene and styrene copolymers, PMMA is a rather expensive material. A further solution to the above-mentioned problem is to apply a scratch-resistant curable coating (e.g. a UV-curable coating) on the surface of the polymer article. This approach, however, is typically also expensive and requires an additional processing step resulting in higher cycle time.

Different thermoplastic polymer compositions comprising organopolysiloxane compounds are known in the art.

JP H0625507A relates to a scratch resistant rubber-modified styrene-based resin composition. The composition is obtained by incorporation a copolymer of a styrene-based monomer and a (meth)acrylic ester monomer and a rubbery elastomer (e.g. a styrene-butadiene copolymer) with an organopolysiloxane (e.g. polydimethylsiloxane).

JP 000056239610A relates to a rubber-modified styrene-based resin composition which is obtained by incorporating a rubber-modified styrene based resin prepared by dissolving a rubbery polymer in a styrene-based monomer and polymerizing the resultant mixture with an organopolysiloxane and a comb-shaped copolymer having a backbone chain part consisting of a polymer of a styrene-based monomer and a side chain part consisting of a polymer of an acrylate-based monomer.

JP 000S57187346A relates to a rubber-modified styrene resin composition containing a rubbery polymer and an organopolysiloxane (e.g. polydimethylsiloxane). The rubber-modified styrene resin is prepared by a bulk polymerization method or a bulk suspension polymerization method and comprises rubbery particles having diameters in the range from 0.5 to 2.5 μm. The organopolysiloxane is added in amounts of 0.002 to 0.2 wt.-% in terms of silicon.

JP 000S61118433A relates to a composition for foaming obtained by compounding a rubbery polymer latex (e.g. a styrene-butadiene copolymer rubber latex) with an aqueous solution of an organic or inorganic ammonium salt and an organopolysiloxane (e.g. dimethylsilicone) by emulsifying with an emulsifier.

It was one object of the present invention to provide a styrene-based thermoplastic polymer composition (P) with good scratch resistance and melt-flow characteristics which is obtainable in a convenient process.

DISCLOSURE OF THE INVENTION

The present invention relates to a thermoplastic polymer composition (P) comprising (or consisting of):
(A) 88 to 99.9 wt.-%, preferably 93 to 99.9 wt.-% and in particular 95 to 99.7 wt.-% of at least one styrene-based copolymer;
(B) 0.1 to 5 wt.-%, preferably 0.1 to 4 wt.-%, and in particular 0.2 to 3 wt.-% of at least one modified organopolysiloxane compound;
(C) 0 to 10 wt.-%, preferably 0.1 to 6.9 wt.-%, and in particular 0.5 to 2.8 wt.-%, of at least one colorant, dye or pigment; and
(D) 0 to 3 wt.-%, preferably 0.1 to 3 wt.-%, and in particular 0.5 to 2.8 wt.-%, of at least one further additive;
wherein the constituents (A) to (D) sum up to 100 wt.-% of the thermoplastic polymer composition (P).

It was surprisingly found that the poor scratch resistance properties of styrene-based copolymers can be significantly improved by the addition of 0.1 to 5 wt.-% of a modified organopolysiloxane compound.

In a preferred embodiment of the invention, the thermoplastic polymer composition (P) comprises (or consists of):
(A) 93 to 99.9 wt.-% of at least one styrene-based copolymer;
(B) 0.1 to 4 wt.-% of at least one modified organopolysiloxane compound;
(C) 0 to 6.9 wt.-% of at least one colorant, dye or pigment; and
(D) 0 to 3 wt.-% of at least one further additive;
wherein the constituents (A) to (D) sum up to 100 wt.-% of the thermoplastic polymer composition (P).

In a further embodiment of the invention, the thermoplastic polymer composition (P) comprises (or consists of):
(A) 95 to 99.8 wt.-%, preferably 95 to 99.7 wt.-% of at least one styrene-based copolymer;
(B) 0.2 to 3 wt.-%, preferably 0.3 to 3 wt.-% of at least one modified organopolysiloxane compound;
(C) 0 to 4.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further embodiment of the invention, the thermoplastic polymer composition (P) comprises (or consists of):
(A) 95 to 99.8 wt.-%, preferably 95 to 99.7 wt.-% of at least one styrene-based copolymer;
(B) 0.2 to 2 wt.-%, preferably 0.3 to 2 wt.-% of at least one modified organopolysiloxane compound;
(C) 0 to 4.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further embodiment of the invention, the thermoplastic polymer composition (P) comprises (or consists of):
(A) 95 to 99.8 wt.-%, preferably 95 to 99.7 wt.-% of at least one styrene-based copolymer;
(B) 0.2 to 1 wt.-%, preferably 0.3 to 1 wt.-% of at least one modified organopolysiloxane compound;
(C) 0 to 4.8 wt.-% at least one colorant, dye or pigment; and
(D) 0 to 3 wt.-% at least one further additive;
wherein the constituents (A) to (D) sum up to 100 wt.-% of the thermoplastic polymer composition (P).

In an alternative preferred embodiment of the invention, the thermoplastic polymer composition (P) comprises (or consists of):
(A) 93 to 99.4 wt.-%, preferably 93 to 99.3 wt.-% of at least one styrene-based copolymer;
(B) 0.1 to 4 wt.-% preferably 0.2 to 3 wt.-% of at least one modified organopolysiloxane compound;
(C) 0.5 to 6.9 wt.-% at least one colorant, dye or pigment; and
(D) 0 to 3 wt.-% at least one further additive;
wherein the constituents (A) to (D) sum up to 100 wt.-% of the thermoplastic polymer composition (P).

In a further alternative preferred embodiment of the invention, the thermoplastic polymer composition (P) comprises (or consists of):
(A) 93 to 99.4 wt.-%, preferably 93 to 99.3 wt.-% of at least one styrene-based copolymer;
(B) 0.1 to 4 wt.-%, preferably 0.2 to 3 wt.-% of at least one modified organopolysiloxane compound;
(C) 0 to 6.4 wt.-% at least one colorant, dye or pigment; and
(D) 0.5 to 3 wt.-% at least one further additive;
wherein the constituents (A) to (D) sum up to 100 wt.-% of the thermoplastic polymer composition (P).

In a further preferred embodiment of the invention, the thermoplastic polymer composition (P) comprises (or consists of):
(A) 95 to 98.8 wt.-% of at least one styrene-based copolymer;
(B) 0.2 to 2 wt.-% of at least one modified organopolysiloxane compound;
(C) 0.5 to 4.3 wt.-% at least one colorant, dye or pigment; and
(D) 0.5 to 3 wt.-% at least one further additive;
wherein the constituents (A) to (D) sum up to 100 wt.-% of the thermoplastic polymer composition (P).

In the following, the components/constituents (A) to (D) are described in further detail.

Styrene-Based Copolymer (Constituent A)

The thermoplastic copolymer composition (P) comprises 88 to 99.9 wt.-%, based on the total weight of the thermoplastic copolymer composition (P), of at least one styrene-based copolymer (A).

Preferably, the at least one styrene-based copolymer (A) is comprised in the thermoplastic copolymer composition in amounts of 93 to 99.9 wt.-% and in particular 95 to 99.7 wt.-%, based on the total weight of the thermoplastic copolymer composition (P).

Styrene-based copolymers (A) are well known in the art and typically represent copolymers of styrene and/or α-methyl styrene with suitable co-monomers. In a preferred embodiment, comonomers having polar functional groups are preferred, e.g. as acrylonitrile, meth acrylonitrile, methyl methacrylate, maleic acid anhydride and N-phenylmaleimide. Particular preferred co-monomers are acrylonitrile, meth acrylonitrile, and methyl methacrylate. Most preferred co-monomers are acrylonitrile and methyl methacrylate. Particular suitable styrene-based copolymers (A) within the meaning of this invention are thus copolymers from styrene and/or α-methyl styrene and acrylonitrile and/or methyl methacrylate as comonomer.

In a preferred embodiment, the styrene-based copolymer comprises no impact-modified styrene-based copolymer or rubber-modified styrene-based copolymer.

In a further preferred embodiment of the invention, the thermoplastic polymer composition (P) comprises at least one styrene-based copolymer (A) selected from poly(styrene-co-acrylonitrile) (SAN), poly(α-methyl styrene-co-acrylonitrile) (AMSAN), poly(styrene-co-methyl methacrylate) (SMMA) and mixtures thereof. Particular preferred are styrene-based copolymers (A) selected from poly(α-methyl styrene-co-acrylonitrile) (AMSAN), poly(styrene-co-methyl methacrylate) (SMMA) and mixtures thereof.

Poly(styrene-acrylonitrile) (SAN) and/or poly(α-methyl styrene/acrylonitrile) (AMSAN) are copolymers known in the art. In general, any SAN and/or AMSAN copolymer known in in the art may be used within the subject-matter of the present invention.

In a preferred embodiment, the SAN and AMSAN copolymers of the present invention contain:
from 50 to 99 wt.-%, based on the total weight of the SAN and/or AMSAN copolymer, of at least one member selected from the group consisting of styrene and α-methyl styrene, and
from 1 to 50 wt.-%, based on the total weight of the SAN and/or AMSAN copolymer, of acrylonitrile.

The weight average molecular weight (as determined by gel permeation chromatography relative to polystyrene as standard and THF as solvent) of the SAN or AMSAN copolymer is often in the range of 15,000 to 200,000 g/mol, preferably in the range of 30,000 to 150.000 g/mol.

Particularly preferred ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

Particularly preferred are SAN or AMSAN containing proportions of incorporated acrylonitrile monomer units of <36 wt.-%, based on the total weight of the SAN and/or AMSAN copolymer.

Preferred are copolymers as component made from, based on
from 65 to 81 wt.-%, based on the total weight of the SAN and/or AMSAN copolymer, of at least one member selected from the group consisting of styrene and α-methyl styrene, and
from 19 to 35 wt.-%, based on the total weight of the SAN and/or AMSAN copolymer, of acrylonitrile.

Among the afore-mentioned, most preferred SAN or AMSAN copolymers, those having a viscosity number VN (determined according to DIN 53726 at 25° C., 0.5% by weight in dimethylformamide) of from 50 to 120 ml/g are in particular preferred.

The copolymers of SAN or AMSAN component are known and the methods for their preparation, for instance, by radical polymerization, more particularly by emulsion, suspension, solution and bulk polymerization are also well documented in the literature.

Details concerning the production of these resins are described for example in U.S. Pat. Nos. 4,009,226 and 4,181,788. Vinyl resins produced by bulk polymerization or solution polymerization have proved to be particularly suitable. The copolymers may be added alone or as an arbitrary mixture.

Said AMSAN copolymers are known products which are commercially available e.g. from INEOS Styrolution GmbH (Frankfurt, Germany) as Luran® HH-120.

Poly(styrene-co-methyl methacrylate) (SMMA) within the meaning of the present invention is any copolymer of methyl methacrylate and styrene. Typical SMMA copolymers are known in the art. In general, any SMMA copolymer known in the art may be used within the subject-matter of the present invention.

In a preferred embodiment, the SMMA copolymer comprises at least one copolymer obtained by the polymerization of 70 to 90 wt.-%, based on the total weight of the monomer composition, of styrene and 10 to 30 wt.-%, based on the total weight of the monomer composition, of methyl methacrylate.

In a further preferred embodiment, the amount of styrene is from 70 to 85 wt.-% and the amount of methyl methacrylate is from 15 to 30 wt.-%. In particular preferred SMMA copolymers the amount of styrene is from 70 to 80 wt.-% and the amount of methyl methacrylate is from 20 to 30 wt.-%. Most preferred are SMMA copolymers wherein the amount present of styrene is from 74 to 80 wt.-% and the amount present of methyl methacrylate is from 20 to 26 wt.-%.

Said SMMA copolymers are known products which are commercially available from INEOS Styrolution GmbH (Frankfurt, Germany) as NAS® 21, NAS®30, and NAS® 90.

Modified Organopolysiloxane Compound (Constituent B)

In one embodiment of the invention, the thermoplastic polymer composition (P) comprises 0.1 to 5 wt.-%, preferably 0.1 to 4 wt.-%, and in particular 0.2 to 3 wt.-%, based on the entire weight of the thermoplastic polymer composition (P), of at least one modified organopolysiloxane compound (B).

The modified organopolysiloxane compound (B) is preferably represented by a polysiloxane compound comprising polymeric moieties which are derived from monomers comprising functional groups other than olefinic functional groups. Suitable polymeric moieties comprise ester group, and acrylic ester groups. In a particular preferred embodiment, the at least one modified organopolysiloxane compound (B) is a polyester modified polysiloxane. It is further preferred that the at least one organopolysiloxane compound is a polyester-polysiloxane-block copolymer.

Suitable examples of the polyester-polysiloxane-blockcopolymer preferably comprise polysiloxane moieties derived from repeating units having the following formula (Ia):

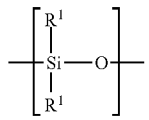
(Ia)

wherein each $R^1$ is independently selected from a linear or branched, saturated or unsaturated hydrocarbon group having 1 to 10, preferably 1 to 6, carbon atoms.

In a preferred embodiment, each $R^1$ is identical and selected from a linear or branched, saturated hydrocarbon group having 1 to 6 carbon atoms.

Preferred examples of the polysiloxane moieties comprised in the polyesterpolysiloxane-blockcopolymer are derived from poly(dimethylsiloxane), poly(diethylsiloxane), poly(dipropylsiloxane), poly(dibutylsiloxane) and mixtures thereof.

In a further preferred embodiment, the polyester moiety of the polyester modified organopolysiloxane compound (B) is derived from repeating units having the following formula (II):

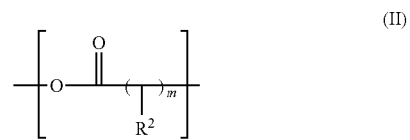
(II)

wherein $R^2$ is independently selected from a hydrogen atom and a linear or branched, saturated or unsaturated hydrocarbon group having 1 to 10, preferably 1 to 6, carbon atoms, and m is an integer from 1 to 10, preferably 1 to 5.

In a preferred embodiment, $R^2$ represents a hydrogen atom.

In a preferred embodiment, the at least one modified organopolysiloxane compound (B) is a [polyester-b-polysiloxane-b-polyester] triblock copolymer.

In a further embodiment of the invention, the at least one modified organopolysiloxane compound (B) is preferably a [polyester-b-polysiloxane-b-polyester] triblock copolymer represented by the following formula (III):

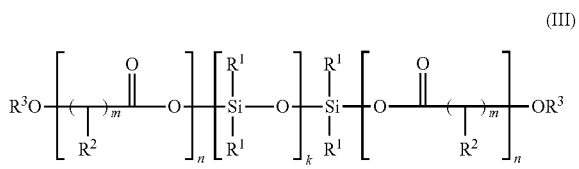
(III)

wherein $R^1$, $R^2$ and m have the same meaning as defined above;
$R^3$ is selected from a hydrogen atom and a linear or branched, saturated or unsaturated hydrocarbon group having 1 to 10, preferably 1 to 6, carbon atoms;
and k and n are integers from 1 to 500, preferably 1 to 250.

In a particular preferred embodiment, the at least one modified organopolysiloxane compound (B) is a [polyester-b-polysiloxane-b-polyester] triblock copolymer represented by formula (III), wherein
$R^1$ is selected from a linear or branched, saturated hydrocarbon group having 1 to 6 carbon atoms;
$R^2$ and $R^3$ represent hydrogen atoms;
m is an integer from 1 to 10, preferably 1 to 5; and k and n are integers from 5 to 250.

In an alternative preferred embodiment, the at least one modified organopolysiloxane compound (B) comprises polysiloxane moieties derived from repeating units having the above-defined formula (Ia) and from repeating units having the following formula (Ib):

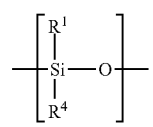
(Ib)

wherein $R^1$ is defined as above and $R^4$ represents a polyester moiety of the polyester modified organopolysiloxane compound (B) is derived from repeating units having the above-defined formula (II). The repeating units of formula (Ib) are statistically distributed within the polysiloxane moieties and amount to 1 to 50 wt.-%, preferably 2 to 30 wt.-%, in particular 3 to 15 wt.-%, based on the entire weight of the polysiloxane moieties. In another aspect of the invention, the polysiloxane moieties comprise 1-50 mol-%, preferably 2-30 mol-%, in particular 3-15 mol-%, of repeating units derived from repeating units of formula (Ib), the remainder being repeating units derived from repeating units of formula (Ia). Thus, the alternative embodiment relates to a block copolymer having a brush structure.

The at least one modified organopolysiloxane compound (B) is preferably has a weight average molecular weight Mw of 20,000 g/mol to 1,000,000 g/mol. In a preferred embodiment, the at least one modified organopolysiloxane compound (B) has either a weight average molecular weight Mw of about 25,000 50,000 g/mol, in particular 35,000 to 45,000 g/mol, or a ultra-high molecular weight of 100,000 g/mol to 1,000,000 g/mol, more preferred 300.000 g/mol to 900.000 g/mol, determined by gel permeation chromatography (GPC) relative to polystyrene as standard and THF as solvent.

The melting point of the polyester modified organopolysiloxane compound (B) is preferably in a range between 20° C. and 100° C., more preferably between 40° C. and 70° C. and in particular in the range between 50° C. and 60° C., otherwise determined under ambient conditions.

The polyester modified organopolysiloxane compound (B) may be produced by any polymerization process known in the art. Preferably, the modified organopolysiloxane compound (B) may be obtained by co-polymerization of appropriate siloxane monomeric units with monomeric units which are appropriate to form polyester moieties, e.g. in a polycondensation reaction of polyfunctional alcohols and polyfunctional carboxylic acids or salts thereof. All monomers may be mixed and polymerized in one step.

Alternatively, the polymerization of the siloxane monomers or the ester-building monomers may be effected in a separate step and the other monomer may be graft-polymerized thereto. It is also possible to provide macro monomer of both, the polysiloxane and the polyester moieties, and obtain the polyester modified organopolysiloxane compound (B) in a final coupling reaction, e.g. a condensation or transersterification step.

Dyes, Pigments, Colorants (Constituent C)

The thermoplastic polymer composition (P) may further comprise 0 to 10 wt.-%, preferably 0.1 to 7 wt.-% and in particular 0.5 to 5 wt.-% of dyes, pigments, or colorants (C) which may be added in form of master batches comprising the dyes, pigments, or colorants (C) in a polymer matrix. In a preferred embodiment, the dyes, pigments, or colorants (C) are added in form of a master batch comprising 20 to 70 wt.-%, preferably 40 to 60 wt.-%, based on the total amount of the master batch, of dyes, pigments, colorants (C) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Additives (Constituent D)

Various (further) additives (D) may be added to the molding compounds in amounts of from 0.1 to 3 wt.-% as assistants and processing additives. Suitable additives (D) include all substances customarily employed for processing or finishing the polymers. In general, the presence of modified organopolysiloxane compounds (B) does not exclude the presence of additives (D) comprising modified organopolysiloxane compounds which are different from the modified organopolysiloxane compounds (B).

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 20 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples include antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Hans Zweifel, 6th Edition, Hanser Publishers, Munich, 2009.

Examples of suitable antistatic agents include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include the halogen-containing or phosphorus-containing compounds known to the person skilled in the art, magnesium hydroxide, and also other commonly used compounds, or mixtures thereof.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 μm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molecular weight Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and compounds having analogous structures and also butylated condensation products of p-cresol and dicyclopentadiene. HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$ alkyl esters of thiopropionic acid, in particular the stearyl esters and lauryl esters. It is also possible to use the dilauryl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol).

Suitable lubricants and demolding agents include stearic acids, stearyl alcohol, stearic esters, amide waxes (e.g bis (stearylamide)), polyolefin waxes and/or generally higher fatty acids, derivatives thereof and corresponding fatty acid mixtures comprising 12 to 30 carbon atoms. Also particularly suitable is ethylene-bis(stearamide).

In a further preferred embodiment, the thermoplastic polymer composition (P) may comprise an organic, inorganic or mixed phosphate, in particular an alkaline metal or earth alkaline metal phosphate such as $Ca_3(PO_4)_2$ and/or an organophosphate having alkyl or aryl groups comprising 1 to 12 carbon atoms. These phosphates may be conveniently added in form of a masterbatch, e.g. in combination with polyolefin waxes and/or olefin/styrene copolymers.

Preparation of the Thermoplastic Polymer Composition (P)

The invention also relates to a process for preparing a thermoplastic polymer composition (P) disclosed above, wherein the process comprises at least the following steps:
a) Providing the components (A) to (D) in the predetermined amounts to an optionally heatable mixing device; and
b) Blending the components (A) to (D) in the optionally heatable mixing device at temperatures above the glass transition temperature of the components (A) to (D) to obtain the thermoplastic polymer composition (P).

Optionally, a step in which a homogenous particulate material mixture is prepared from the components (A) to (D) may be carried out prior to step b). However, also when provided to the optionally heatable mixing device without previous mixing, a homogenous mixing is typically achieved in the optionally heatable mixing device.

Components (A) to (D) are typically provided in form of particulate materials having different particle sizes and particle size distributions. Typically, the components are provided in form of powders and/or granules. These may, for example, be chosen with respect to their commercial availability.

The particulate constituents (A) to (D) are provided to a mixing device in the required amounts and ratios as previously indicated and optionally mixed prior to the blending step b) in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (B), and—where included—(C) and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder or a kneader. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based copolymer (A) and the inorganic metal nanoparticles (B) and—when present—the colorant, dye and/or pigment (C) and/or the further additives (D), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150° C. to 400° C., preferably 170° C. to 300° C.

In a preferred embodiment a heatable twin-screw extruder and a speed of 50 to 150 rpm, preferably 60 to 100 rpm is employed. Preferably, an extruding temperature of 170° C. to 270° C., preferably 210° C. to 250° C. is employed to obtain the thermoplastic polymer composition (P). The thermoplastic polymer composition (P) may be directly used, e.g. in molding processes, preferably injection molding processes, or may be processed to form granules which may be subjected to molding processes afterwards. The molding processes are preferably carried out at temperatures of 170° C. to 270° C., in particular 210° C. to 250° C. to result in polymer molded articles.

A further object of the invention is a polymer composition, comprising 50 to 99 wt.-% of the thermoplastic polymer composition (P) and 50 to 1 wt.-% of at least one further thermoplastic polymer. In a preferred embodiment, the at least one further thermoplastic polymer is selected from styrene-based copolymers other than the styrene-based copolymer (A) (e.g. SAN, AMSAN or SMMA), polyolefins (e.g. polyethylene, polypropylene), polycarbonates, polyamides and mixtures thereof.

The invention further relates to a molded article, prepared from a thermoplastic polymer composition (P) or a polymer composition, comprising a thermoplastic polymer composition (P) in combination with a further thermoplastic polymer as described above. The molded article may be prepared by any known processes for thermoplastic processing. In particular preparation may be effected by thermoforming, extruding, injection molding, calendaring, blow molding, compression molding, press sintering, deep drawing or sintering, preferably by injection molding.

The thermoplastic polymer composition (P) and the molded articles are advantageously used for the manufacture of components or articles for electronic devices, household goods and automotive parts, in particular for the manufacture of visible components or articles. A preferred application is the use in A/B/C pillars of automobiles.

Properties

The properties of the thermoplastic polymer composition (P) according to the present invention were determined. It was surprisingly found by the present inventors that the thermoplastic polymer composition (P) comprising 0.1 to 5 wt.-% of a modified organopolysiloxane compound (B) exhibits improved residual gloss after abrasion combined with improved melt flow characteristics compared to polymer compositions comprising only styrene-based copolymers (A). Heat resistance is not affected.

It was observed that the thermoplastic polymer composition (P) according to the invention in a scratch resistance test following ISO 1518-1 realized with an Erichsen Linear Tester) preferably requires a minimum normal load of at least 300 g, more preferably of at least 500 g and in particular of at least 600 g to achieve a full scratch mark on the surface of the sample. By contrast, the minimum normal load necessary to achieve a full scratch mark on the surface of the sample of the styrene-based copolymer (A) in the absence of the modified organopolysiloxane compound (B) is considerably lower.

The scratch resistance is thus improved by a factor of at least 2, preferably by a factor of at least 4, more preferably by a factor of at least 8 an in particular by a factor of at least 10.

Moreover, was surprisingly found by the present inventors that the thermoplastic polymer composition (P) comprising 0.1 to 5 wt.-% of the at least one modified organopolysiloxane compound (B) combines improved residual gloss properties with an improved melt volume-flow rate (MVR). On the other hand, properties of the thermoplastic polymer composition (P) remain constant with respect to heat resistance. This specific combination of properties is vital in particular for injection molding processes and final applications.

As regards the gloss, the surfaces of samples prepared from the thermoplastic polymer composition (P) according to the invention preferably exhibit a residual gloss of more than 15%, preferably more than 20%, most preferably more than 25% after abrasion was effected according to PV3975 compared to the surface of the non-abraded thermoplastic polymer composition (P).

Concerning the melt characteristics of the thermoplastic polymer composition (P) according to the invention, a melt volume-flow rate (MVR, 220 ml/10 min according to ISO 1133), which is increased by a factor of at least 1.2, preferably by a factor of at least 1.4, in particular by a factor of 1.5, compared to the melt volume-flow rate of a thermoplastic polymer composition which does not comprise the at least one modified organopolysiloxane compound (B) is observed.

In a further embodiment, the heat resistance, determined as the Vicat softening temperature (VST B50, according to DIN EN ISO 306), of the thermoplastic polymer composition (P) is reduced by less than 5° C., preferably less than 3° C., most preferably less than 1° C., compared to the Vicat softening temperature of a thermoplastic polymer composition which does not comprise the at least one modified organopolysiloxane compound (B).

The invention is further illustrated by the examples and claims.

EXAMPLES

Materials
Constituent A:
A-1 AMSAN copolymer with an acrylonitrile content of 30 wt.-%, having a viscosity number VN of 57 ml/g and a Vicat softening temperature (VST B50) of 120° C. (commercially available as Luran® HH-120 from INEOS Styrolution, Germany).
A-2 SMMA copolymer having a melt volume-flow rate (MVR 220/10) of 30 ml/10 min, and Vicat softening temperature (VST B50) of 98° C. (commercially available as NAS® 30 from INEOS Styrolution, Germany).
A-3 PMMA having a melt volume-flow rate (MVR 230° C./3.8 kg) of 6 ml/10 min, a Vicat softening temperature (VST B50) of 103° C., a refractive index of 1.49, a density of 1.19 g/ml (commercially available as Plexiglas® 7N from Evonik Industries AG, Germany).
Constituent B:
B-1: A polyester modified polysiloxane having a melting point of approximately 54° C. and a water content of <0.1% was used (commercially available as Tegomer® H-Si 6441P from Evonik Industries GmbH, Essen, Germany).
Constituent C
C-1: Carbon Black 08 (20 wt.-% in a SAN copolymer based on the total weight of C-1).
C-2: Colorant composition comprising 21.6 wt.-% Pyrazolone Yellow, 62.4 wt.-% Allizarin Blue, 8 wt.-% Alizarin Violet and 8 wt.-% Carbon Black, based on the total weight of C-2.
C-3 Carbon Black 08
Constituent D
D-1 Additive composition comprising 26.23 wt.-% UV Stabilizer Tinuvin 770, 15.48 UV Stabilizer Chimasorb 944, 31.69 wt.-% UV Stabilizer Cyasorb 3853 (50 wt.-% in polypropylene), and 26.23 wt.-% stearyl alcohol bag, based on the total weight of D-1.

Sample Preparation of Polymer Composition

Example 1 was prepared by compounding the constituents A and B in the amounts given in Table 1 using a Coperion® ZSK25 twin-screw extruder (Tm: 215 to 235° C., die temperature: 240° C.). Sample plaques (size: 200*140*4 mm) have been prepared via injection molding at 240° C.

Comparative Example 1 was prepared by compounding the constituents A and C in the amounts given in Table 1 using a Coperion® ZSK25 twin-screw extruder (Tm 210° C.). Sample plaques (size: 200*140*4 mm) have been prepared via injection molding at 240° C.

Example 2 was prepared by compounding the constituents A and B in the amounts given in Table 1 using a Coperion® ZSK25 twin-screw extruder (Tm: 215 to 235° C., die temperature: 240° C.). Sample plaques (size: 200*140*4 mm) have been prepared via injection molding at 240° C.

Comparative Example 2 has been prepared from constituent A-2. Sample plaques (size: 200*140*4 mm) were prepared via injection molding at 240° C.

Example 3 and Comparative Example 3 were prepared by compounding the constituents A to D in the amounts given in Table 1 using a Coperion® ZSK26MC twin-screw extruder (length: 1035 mm, Tm=240° C.). Sample plaques (size: Din A5) have been prepared via injection molding at 242° C.

Comparative Example 4 was prepared from constituents A-3 and C-3 in amounts of Table 1 using a Coperion ZSK-25 twin screw extruder. Sample plagues (200*140*4 mm) were prepared via injection molding under the following injection molding conditions: pre-drying (2-3 h, max. 93° C.), mass temperature Tm 220 to 260° C., mold temperature 60° C. to 90° C.

Comparative Example 5 was prepared from constituent A-3 via injection molding of A5 plaques (Tm 242° C., max injection pressure 580 bar).

Testing Methods

The properties of the thermoplastic polymer compositions (P) were evaluated by the following testing methods. The same methods were applied to determine the properties of the constituents (A) to (D), where necessary.

Scratch Resistance

Scratch resistance was tested using an Erichsen Linear Tester (Model 249) equipped with an indenter according to ISO 1518-1 (hard metal coating). Prior to testing all samples have been conditioned at 23° C./50% r.h. for 48 h. The indenter was moved with a speed of 100 mm/s over the surface of the sample (35 or 55 mm scratch path length). The normal load (force of the indenter) is adjusted by using a balance in the following steps 50 g, 100 g, 150 g, 200 g, 300 g, 400 g, 500 g, 600 g, 700 g, 800 g, 900 g, 1000 g for performing scratches beside the previous tested loads. After scratching the surface is evaluated in direct visual examination in reflection of diffuse daylight and/or fluorescent tube light in a geometry of 0° to 85° to the perpendicular line of the surface. The minimum loads (in g) to first achieve a scratch mark on the surface are recorded. A full scratch is identified by color changes, reflections by the formed hollows or surface roughness in parts of the scratch area respectively shown in the complete scratched area. Additionally the scratch appearance as well as the minimum loads are compared to the base material.

Residual Gloss

Abrasion was effected according to PV3975. A Martindale abrasion tester was used with 281Q WOD abrasive paper (9 mic, 215.9 mm*279 mm, 3M). All samples have been conditioned at 18-28° C./50% relative humidity for 7 days. The number of cycles during testing was 10 with a load of 12 kPa. After abrasion, gloss was measured at 20° using a Multigloss 268 (Konica Minolta). Gloss retention (residual gloss) is calculated according to the following formula:

$$\text{residual gloss} = \frac{\text{gloss after testing}}{\text{initial gloss}}$$

Melt volume-flow rate (MVR 220° C./10 kg) was measured according to ISO 1133.

Viscosity number was measured according to DIN 53727 at 25° C. as 0.5 wt.-% solution in dimethylformamide (DMF).

Refractive Index was measured according to ASTM D 542 (sodium line).

Density was measured according to DIN EN ISO 1183.

Vicat softening temperature (VST B50) was measured according to DIN EN ISO 306.

The weight average molecular weight Mw was determined by gel permeation chromatography using UV-detection. Polystyrene was used as standard. Typically, tetrahydrofuran was used as solvent.

The test results are summarized in Tables 2 and 3.

TABLE 1

| Ex. No. | Const. A | Amount Const. A [wt.-%] | Const. B | Amount Const. B [wt.-%] | Const. C | Amount Const. C [wt.-%] | Const. D | Amount Const. D [wt.-%] |
| --- | --- | --- | --- | --- | --- | --- | --- | --- |
| Ex. 1 | A-1 | 99.75 | B-1 | 0.25 | — | — | — | — |
| Comp. Ex. 1 | A-1 | 97.45 | — | — | C-1 | 2.55 | — | — |
| Ex. 2 | A-2 | 99 | B-1 | 1 | — | — | — | — |
| Comp. Ex. 2 | A-2 | 100 | — | — | — | — | — | — |
| Ex. 3 | A-1 | 95.47 | B-1 | 1.5 | C-2 | 1.23 | D-1 | 1.80 |
| Comp. Ex. 3 | A-1 | 96.92 | — | — | C-2 | 1.25 | D-1 | 1.83 |
| Comp. Ex. 4 | A-3 | 99.5 | — | — | C-3 | 0.5 | — | — |
| Comp. Ex. 5 | A-3 | 100 | — | — | — | — | — | — |

TABLE 2

| Ex. No. | min. load for full scratch [g] |
| --- | --- |
| Ex. 1 | 600 |
| Comp. Ex. 1 | 50 |
| Ex. 2 | 600 |
| Comp. Ex. 2 | 150 |
| Comp. Ex. 4 | 600 |

The examples clearly show that the addition of the polyester modified polysiloxane according to the present invention to different styrene-based copolymers has significant effects on the improvement of scratch resistance determined using test plaques prepared from the inventive thermoplastic polymer composition (P) with an Erichsen Linear Tester 249 compared to the pure base resin. Comp. Ex. 1 and 2 show a full scratch already at very low normal loads of 50 to 150 g. On the other hand Comp. Ex. 4, prepared from PMMA instead of styrene-based copolymer, represents a comparative compound which is typically used as a polymer with excellent scratch resistance. Full scratch is observed only at 600 g. However, PMMA is more expensive than the styrene-based copolymers.

It was surprisingly found that by adding 0.1 to 5 wt.-% of the polyester modified polysiloxane to the styrene-based copolymer the normal load necessary to achieve a full scratch on the surface of the test sample can be significantly increased.

Example 1 shows that the addition of small amounts of a polyester modified polysiloxane results in an increase of scratch resistance of an AMSAN copolymer composition compared to the respective pure AMSAN copolymer (Comp. Ex. 1) by a factor of 12. The normal load to achieve full scratch is increased from 50 g (Comp. Ex. 1) to 600 g (Ex. 1).

Similar results are observed for the addition of small amounts of a polyester modified polysiloxane to an SMMA copolymer composition (Ex. 2). Compared to the respective pure AMSAN copolymer (Comp. Ex. 1) an increase of scratch resistance by a factor of 4 is observed. The normal load to achieve full scratch is increased from 150 g (Comp. Ex. 2) to 600 g (Ex. 2).

TABLE 3

| No. | Residual gloss [%] | MVR 220/10 [ml/10 min] | Vicat softening temperature (VST B50) [° C.] |
|---|---|---|---|
| Ex. 3 | 22.3 | 17.6 | 114.3 |
| Comp. Ex. 3 | 16.5 | 11.5 | 114.3 |
| Comp. Ex. 5 | 35.9 | — | — |

As can be seen from Table 3, it was surprisingly found that the addition of the polyester modified polysiloxane also results in an increased melt volume-flow rate, while Vicat softening temperature remains unaltered.

In particular, the comparison of Ex. 3 and Comp. Ex. 3 shows an increase in melt volume-flow rate, which is a very important property for the injection molding process, by a factor of 1.5. The Vicat softening temperature, which is very important for final application, remains unchanged.

Moreover, it was found that the residual gloss of the surface of the test specimen is considerably higher after abrasion, if the thermoplastic polymer composition (P) according to the invention is used. The residual gloss is increased from 16.5% for the pure base resin (Comp. Ex. 3) to 22.3% for the inventive thermoplastic polymer composition (Ex. 3). Comp. Ex. 5 gives the respective value of a PMMA sample.

The obtained improved characteristics of the thermoplastic polymer composition (P) according to the present invention turn the composition to a convenient and inexpensive alternative to poly(methyl-methacrylate) compositions and/or UV-cured surfaces in applications such as housings of household goods and electronic devices as well as interior parts in the automotive industry.

The invention claimed is:
1. A thermoplastic polymer composition (P) comprising:
(A) 88 to 99.9 wt.-% of at least one styrene-based copolymer, wherein the at least one styrene-based copolymer is selected from poly(a-methylstyrene-co-acrylonitrile) (AMSAN), poly(styrene-co-methyl methacrylate) (SMMA), and mixtures thereof;
(B) 0.1 to 5 wt.-% of at least one modified organopolysiloxane compound;
(C) 0 to 10 wt.-% of at least one colorant, dye or pigment; and
(D) 0 to 3 wt.-% of at least one further additive,
wherein the constituents (A) to (D) sum up to 100 wt.-% of the thermoplastic polymer composition (P),
wherein the at least one modified organopolysiloxane compound is a polyester-polysiloxane-block copolymer.

2. The thermoplastic polymer composition (P) according to claim 1, wherein the thermoplastic polymer composition (P) comprises as constituent (A) 93 to 99.9 wt.-% of at least one styrene-based copolymer, wherein the at least one styrene-based copolymer is selected from poly(α-methylstyrene-co-acrylonitrile) (AMSAN), poly(styrene-co-methyl methacrylate) (SMMA), and mixtures thereof.

3. The thermoplastic polymer composition (P) according to claim 1, wherein the thermoplastic polymer composition (P) comprises as constituent (B) 0.1 to 4 wt.-% of at least one modified organopolysiloxane compound.

4. The thermoplastic polymer composition (P) according to claim 1, wherein the thermoplastic polymer composition (P) comprises as constituent (C) 0.1 to 6.9 wt.-% of at least one colorant, dye, or pigment.

5. The thermoplastic polymer composition (P) according to claim 1, wherein the at least one modified organopolysiloxane compound has a weight average molecular weight Mw of 20,000 g/mol to 1,000,000 g/mol, determined by gel permeation chromatography (GPC) relative to polystyrene as standard.

6. The thermoplastic polymer composition (P) according to claim 1, wherein the at least one modified organopolysiloxane compound is a [polyester-b-polysiloxane-b-polyester] triblock copolymer or a [polysiloxane-b-polyester] brush copolymer.

7. The thermoplastic polymer composition (P) according to claim 6, wherein the at least one modified organopolysiloxane compound is a [polyester-b-polysiloxane-b-polyester] triblock copolymer represented by the following formula (III):

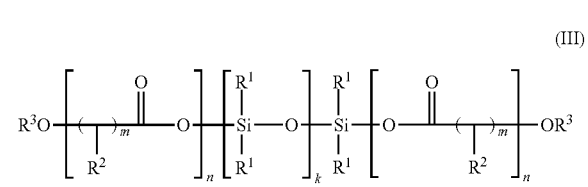

wherein each
R$^1$ is independently selected from a linear or branched, saturated or unsaturated hydrocarbon group having 1 to 10 carbon atoms;
R$^2$ is independently selected from a hydrogen atom and a linear or branched, saturated or unsaturated hydrocarbon group having 1 to 10 carbon atoms;
R$^3$ is selected from a hydrogen atom and a linear or branched, saturated or unsaturated hydrocarbon group having 1 to 10 carbon atoms;
m is an integer from 1 to 10; and
k and n are integers from 1 to 500.

8. The thermoplastic polymer composition (P) according to claim 6, wherein the at least one modified organopolysiloxane compound is a [polysiloxane-b-polyester] brush copolymer comprising polysiloxane moieties derived from repeating units having the following formula (Ia) and from repeating units having the following formula (Ib):

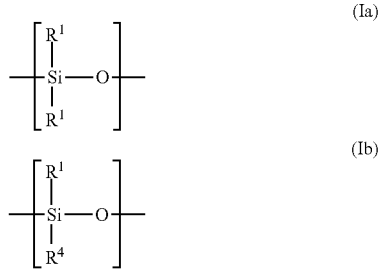

wherein each
- $R^1$ is independently selected from a linear or branched, saturated or unsaturated hydrocarbon group having 1 to 10 carbon atoms;
- $R^4$ represents a polyester moiety of the polyester modified organopolysiloxane compound (B) is derived from repeating units having the following formula (II):

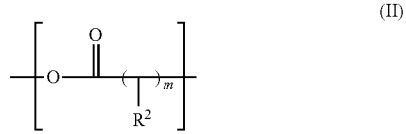

wherein $R^2$ is independently selected from a hydrogen atom and a linear or branched, saturated or unsaturated hydrocarbon group having 1 to 10 carbon atoms; and m is an integer from 1 to 10, wherein each chain and side chain of the polymer is terminated by a hydrogen atom or a linear or branched, saturated or unsaturated hydrocarbon group having 1 to 10 carbon atoms; and wherein the repeating units of formula (Ib) are statistically distributed within the polysiloxane moieties and amount to 1 to 50 wt.-%, based on the entire weight of the polysiloxane moieties.

9. The thermoplastic polymer composition (P) according to claim 1, wherein an article prepared from the thermoplastic polymer composition (P) requires a minimum normal load of at least 300 g in a scratch resistance test following ISO 1518-1 to achieve a full scratch mark on the surface of the article.

10. The thermoplastic polymer composition (P) according to claim 1, wherein the surface of the thermoplastic polymer composition (P) has a residual gloss of more than 15% after abrasion was effected according to norm PV3975 compared to the surface of the non-abraded thermoplastic polymer composition (P).

11. The thermoplastic polymer composition (P) according to claim 1, wherein the melt volume-flow rate (MVR, 220 ml/10 min according to ISO 1133) of the thermoplastic polymer composition (P) is increased by a factor of at least 1.2 compared to the melt volume-flow rate of a thermoplastic polymer composition which does not comprise the at least one modified organopolysiloxane compound (B).

12. The thermoplastic polymer composition (P) according to claim 1, wherein the Vicat softening temperature (VST B50, according to DIN EN ISO 306) of the thermoplastic polymer composition (P) is reduced by less than 5° C. compared to the Vicat softening temperature of a thermoplastic polymer composition which does not comprise the at least one modified organopolysiloxane compound (B).

13. A process for the preparation of the thermoplastic polymer composition (P) according to claim 1, wherein the process comprises at least the following steps:
  a) providing the components (A) to (D) in the predetermined amounts to an optionally heatable mixing device; and
  b) blending the components (A) to (D) in the optionally heatable mixing device at temperatures above the glass transition temperature of the components (A) to (D) to obtain the thermoplastic polymer composition (P).

14. A molded article, prepared from the thermoplastic polymer composition (P) according to claim 1.

15. The molded article according to claim 14, wherein the molded article is a component of or article for electronic devices, household goods, and automotive parts.

16. The molded article according to claim 14, where the molded article is a component of or article for A/B/C pillars of automobiles.

* * * * *